United States Patent [19]

Counter et al.

[11] Patent Number: 5,088,597
[45] Date of Patent: Feb. 18, 1992

[54] TRACTION WHEEL

[75] Inventors: Louis F. Counter; Philip M. Dindinger, both of Greendale; Theodore F. Raske, Germantown, all of Wis.

[73] Assignee: Rexnord Corporation, Milwaukee, Wis.

[21] Appl. No.: 672,543

[22] Filed: Mar. 20, 1991

Related U.S. Application Data

[63] Continuation-in-part of Ser. No. 340,237, Apr. 19, 1989, abandoned.

[51] Int. Cl.⁵ .............................................. B65G 23/04
[52] U.S. Cl. ..................................... 198/835; 474/178
[58] Field of Search ............. 198/835, 842, 843, 711, 198/712; 474/177, 178, 179

[56] References Cited

U.S. PATENT DOCUMENTS

| | | | |
|---|---|---|---|
| 2,271,166 | 1/1942 | Weiss | 198/843 |
| 2,436,381 | 2/1948 | Daman | 474/178 |
| 2,491,974 | 12/1949 | Hansen | 198/843 |
| 2,817,430 | 12/1957 | Hapman | 198/711 |
| 3,177,733 | 4/1965 | Yomano | 414/178 |
| 3,494,212 | 2/1970 | Thomson | 474/178 |
| 3,967,721 | 7/1976 | Rhoden | 198/835 |
| 4,227,422 | 10/1980 | Kawashima et al. | 198/843 X |
| 4,468,210 | 8/1984 | McCutchan, Jr. | 474/177 X |
| 4,548,592 | 10/1985 | Ohhashi et al. | 474/177 X |
| 4,688,669 | 8/1987 | Wobick et al. | 198/712 |

FOREIGN PATENT DOCUMENTS

| | | | |
|---|---|---|---|
| 809119 | 7/1951 | Fed. Rep. of Germany | 474/178 |
| 1254918 | 9/1961 | France | 198/835 |
| 1400387 | 4/1965 | France | 198/835 |
| 320175 | 4/1957 | Switzerland | 474/178 |

Primary Examiner—Robert P. Olszewski
Assistant Examiner—Cheryl L. Gastineau
Attorney, Agent, or Firm—Michael, Best & Friedrich

[57] ABSTRACT

An impact damping devise for a conveyor traction wheel assembly adapted to support an elongated flexible drive member. The traction wheel assembly includes a periphery having a circumferential support surface. The impact damping device comprises an elongated generally elastomeric impact damping having a base adapted to extend along at least a portion of the circumferential support surface. The impact damping member further includes spaced apart sides, a radially outwardly facing surface adapted to define at least a portion of a circumferential surface for supporting the elongated flexible drive member and a hollow portion.

28 Claims, 3 Drawing Sheets

TRACTION WHEEL

CROSS REFERENCE TO RELATED APPLICATION

This is a continuation-in-part of U.S. Pat. application Ser. No. 07/340,237, filed Apr. 19, 1989, abandoned.

FIELD OF THE INVENTION

The invention relates to conveyors, such as centrifugal discharge elevator conveyors, and more particularly to systems for reducing noise and damping impact at an end of the conveyor loop, when the conveyor is in use.

BACKGROUND OF THE INVENTION

In centrifugal discharge elevator conveyors, a plurality of spaced apart bucket containers are supported by a vertically extending conveyor chain loop. The buckets are designed to be filled during upward travel, near the bottom of the loop, raised as the loop rotates, and centrifugally discharged during the transition between upward travel and downward travel near the top of the loop during rotation about a "head" traction wheel. A problem with prior art elevator conveyors has been rapid failure of the joint between the bucket and the chain, resulting in dissociation of the bucket from the conveyor chain. This failure is caused by impact forces and centrifugal forces that act on a bucket container as it travels around the head traction wheel, as well as when it travels around the lower, or "foot" traction wheel. More particularly, in prior art elevator conveyors, when a bucket hits a traction wheel, the front edge of the bucket starts vibrating and may reach resonance. The movement of the front edge of the bucket causes deflection of the side walls of the bucket which in turn causes movement of the back of the bucket relative to the chain. This action over time results in failure of the joint between the bucket and the chain.

Another problem with prior art conveyors has been excessive noise at the wheels that guide the conveyor.

It has been heretofore proposed to use pneumatic tires in a conveying apparatus to provide a cushioning action for containers joined together with a cable, the containers being in direct driving contact with a pair of tires defining a loop. See, for example, Hapman U.S. Pat. No. 2,817,430. One problem associated with this design is that a large pneumatic tire is difficult to install and remove. In a pneumatic tire, a sudden loss of air pressure could occur and cause serious consequences. Further, for impact energy to be absorbed by the air in a tire and/or deflection of sidewalls of a tire, the pressure of air inside the tire would have to be maintained within relatively narrow limits. Temperature fluctuations, which can be caused by climatic conditions, or by heating during use of the apparatus, can cause a deviation in the path of travel of the conveyor loop, over time, potentially causing excess slack or tautness, and thereby resulting in wear of the tire and the conveyor loop. Further, a pneumatic tire would likely wear rapidly if used to engage a chain conveyor loop, as opposed to engaging containers as shown in the Hapman patent.

Another centrifugal discharge elevator is disclosed in U.S. Pat. No. 4,688,669, issued to Wobick et al. on Aug. 25, 1987, the specification of which is incorporated herein by reference.

SUMMARY OF THE INVENTION

The invention provides improved traction wheels for use in chain elevators, such as centrifugal discharge elevators, which provide damping of the impact of the buckets and chain against the traction wheels as the buckets pass over the traction wheels, thereby increasing the service life of the buckets and chain and also substantially reducing the operating noise of the elevator.

These and other features and advantages of the invention will become apparent to those skilled in the art upon review of the following detailed description of the preferred embodiment of the invention.

DETAILED DESCRIPTION OF THE PREFERRED EMBODIMENTS

Figure 1:
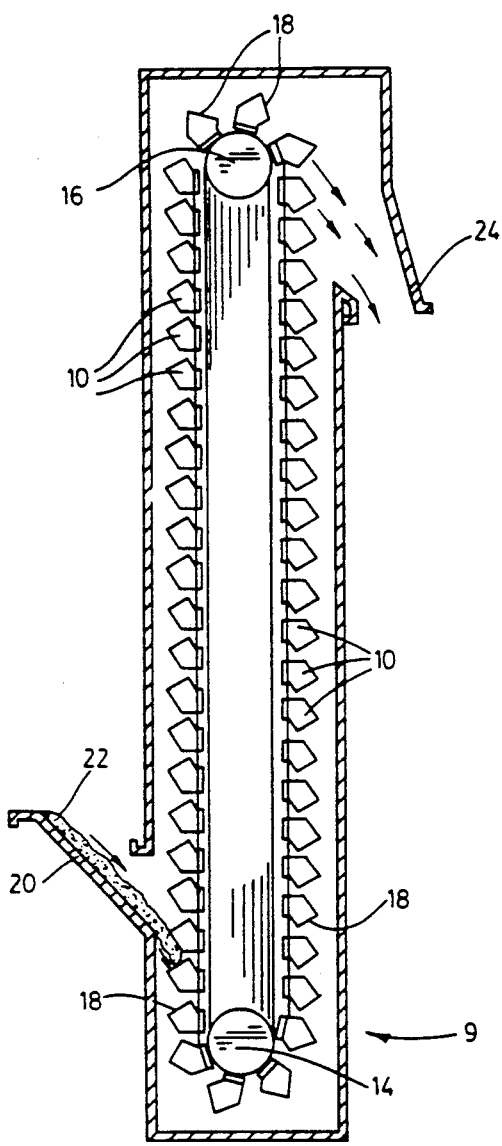
FIG. 1 is a perspective view of a centrifugal discharge chain elevator embodying the invention.

Illustrated in FIG. 1 is a centrifugal discharge elevator 9 embodying the invention. A plurality of bucket containers 10 are mounted to the exterior surface of an elongated flexible drive member 12 adapted to rotate in a loop defined by a foot traction wheel 14 and a head traction wheel 16. At least one of the foot traction wheel 14 and the head traction wheel 16 is driven by a motor (not shown) to cause the drive member 12 to rotate. Near the bottom of the elevator, the bucket containers 10 are filled from their open ends 18, as they travel upwardly past an entry chute 20, through which material 22 to be elevated is supplied. As the drive member 12 rotates, the containers 10 that have been filled with material 22, while passing the entry chute 20, are elevated toward the head traction wheel 16. They then rotate about the head traction wheel 16, and begin traveling downward toward the foot traction wheel. At this time, material 22 elevated by the container 10 is centrifugally discharged from the open end 18 of the container and is expelled through an exit chute 24 near the top of the elevator.

Figure 2:
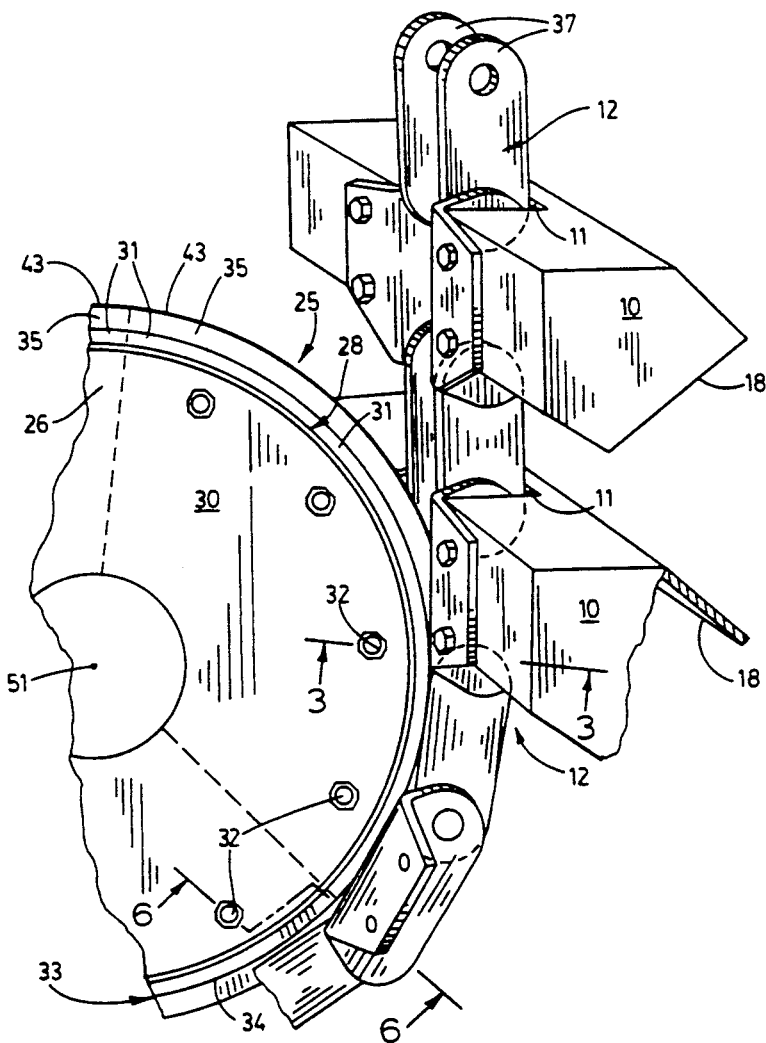
FIG. 2 is an enlarged front elevation view of a portion of the centrifugal discharge chain elevator shown in FIG. 1.

A traction wheel assembly 25 is shown in FIG. 2. In the centrifugal discharge elevator 9 of the preferred embodiment of the invention, both of the foot traction wheel 14 and the head traction wheel 16 are substantially identical to the traction wheel assembly 25; however, it is envisioned that one of the traction wheels 14 and 16 could be of a conventional design.

Figure 3:
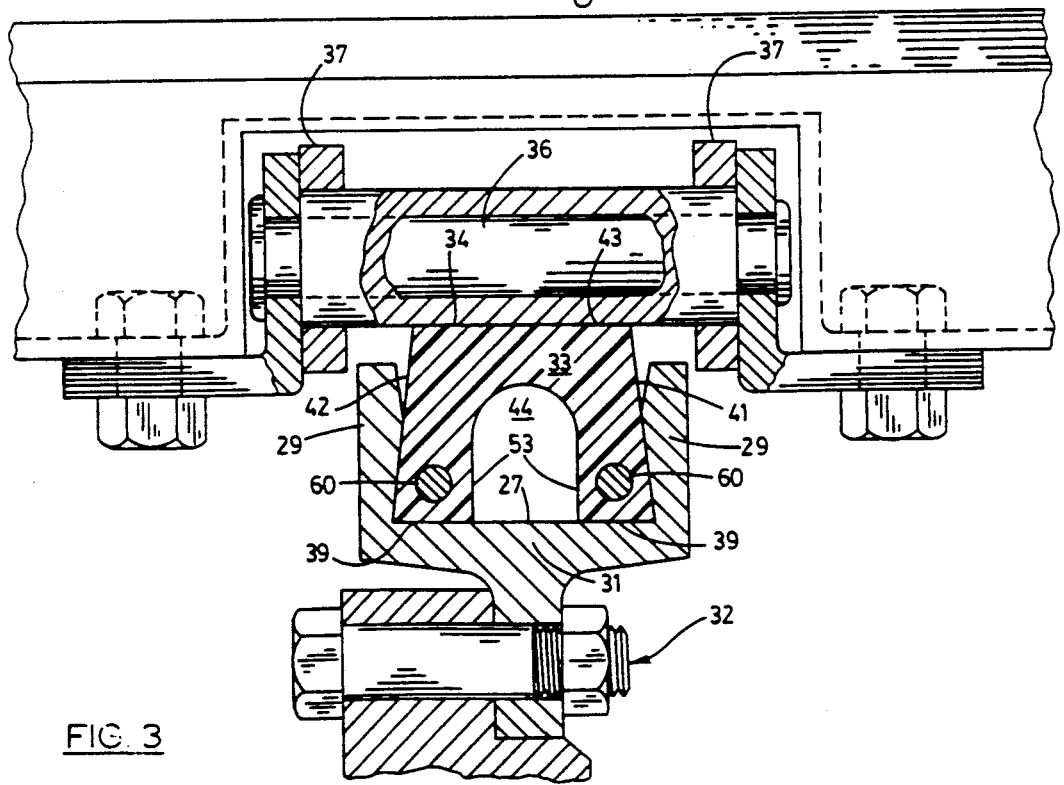
FIG. 3 is an enlarged cross sectional view taken along line 3—3 in FIG. 2.
Figure 6:
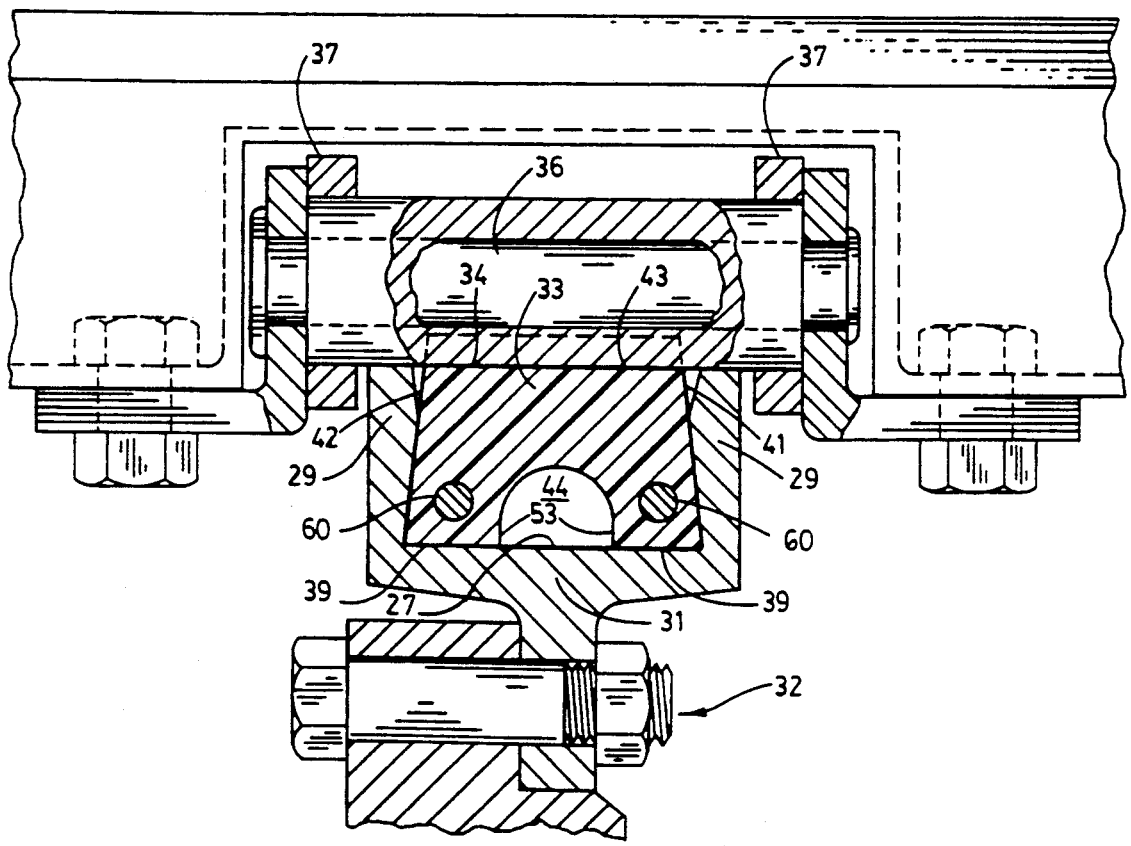
FIG. 6 is an enlarged cross sectional view taken along line 6—6 in FIG. 2.

The traction wheel assembly 25 includes a rotatable member 26 which has a periphery having a circumferential support surface 27 (see FIG. 3). In the illustrated construction the traction wheel assembly includes a rim 28 having two sidewalls 29. The sidewalls 29 each define a circumferential surface for driving the drive member 12 in a fashion that will be explained below. The rotatable member 26 further includes a discoidal hub 30 separate from the rim 28. The rim 28 is comprised of a plurality of generally semi-circular rim sections 31 fastened about the circumference of the hub 30 with fasteners 32. The rim 28 is divided into a plurality of rim sections 31 for ease of installation. The traction wheel assembly 25 further includes an impact damping member 33 adapted to be supported between the sidewalls 29 of the rim 28 to define a radially outwardly facing, substantially continuous circumferential surface 34 normally extending radially outwardly from the rim 28, radially outwardly past the circumferential surfaces defined by the sidewalls of the rim 28. At a location along the circumference of the impact damping member 33, through which passes line 3—3 in FIG. 2, contact is initially made between a location along the drive member 12 and the traction wheel assembly 25, as the location along the drive member 12 rotates around the traction wheel assembly 25. As shown in FIG. 3, the impact damping member 33 is in its normal non-deformed state proximate this location. From the location through which line 3—3 passes, to the location through which line 6—6 passes, the impact damping member 33 is increasingly deformed radially inwardly until, proximate the location through which line 6—6 passes, the sidewalls 29 of the rim 28 contact the drive member 12. More particularly, proximate the location through which line 6—6 passes, the sidewalls 29 of the rim 28 drivingly engage the drive member 12.

The impact damping member 33 is formed of viscoelastic or elastomeric material. In the illustrated embodiment, the impact damping member 33 is formed of molded material. Preferably, for ease of installation, the impact damping member 33 is formed of a plurality of impact damping member segments 35, each segment 35 being adapted to be mounted on one of the rim sections 31 before the rim sections are fastened about the circumference of the hub 30, the plurality of segments 35 defining the circumferential surface 34 after the traction wheel assembly 30 is assembled. In the illustrated embodiment, the impact damping member 33 is formed of a polyurethane material, which polyurethane material is, in the illustrated embodiment, cast polyurethane M.D.I. ester, manufactured by Essex Chemical Corporation, Mobay Chemical Corporation or Uniroyal Plastics Co., Inc. Also in the illustrated embodiment, each segment 35 has a shape corresponding in curvature and circumferential extent with one of the rim sections 31. As can be seen in FIG. 2, the traction wheel assembly 25 drives the drive member 12 supporting the containers 10, which containers include an indentation 11 centered at the bottom thereof, such that the drive member 12 extends into the indentation 11. The drive member 12 of the preferred embodiment is a chain, and the traction wheel assembly 25 drives portions of bushings 36 of the chain 12 at a location between sidebars 37 of which the chain 12 is comprised.

As best shown in FIG. 3, the impact damping member 33 has a base 39 adapted to be positioned against the support surface 27, and spaced apart sides 41 and 42. Each segment 35 of the impact damping member also includes a surface 43 adapted to define a portion of the circumferential surface 34. In the preferred embodiment, the impact damping member 33 is generally frusto-triangular in cross section, as shown in FIG. 3.

A hollow portion 44 is provided in the impact damping member 33 proximate the base 39, which hollow portion extends in the circumferential direction when the traction wheel assembly 25 is assembled. The hollow portion is of a size and shape that accommodates displaced material when the impact damping member 33 is deformed radially inwardly. More particularly, in the illustrated embodiment the hollow portion 44 extends in the radially outward direction from the base 39, when the traction wheel assembly 25 is assembled, and is in the shape of a radially inwardly opening "U" wherein the radial direction is defined relative to an axis of rotation 51 of the traction wheel assembly 25. The hollow portion 44 is centered between the sides 41 and 42 of the impact damping member 33, and in the embodiment of the invention illustrated in the drawings, has a width along the base 39 that is approximately three-sevenths the distance between the sides 41 and 42 along the base 39, and a depth in the radial direction, which depth approximates five-eighths the distance between the base 39 and the circumferential surface 34, when the impact damping member 33 is in its normal, non-deformed state.

Also in the particular embodiment of the invention shown in the drawings, the sides 41 and 42 of the impact damping member 33 are of equal length, and the distance between the sides 41 and 42 along the circumferential surface 34 is approximately nine-tenths the distance between the sides 41 and 42 along the base 39.

The provision of the U-shaped opening or cavity in the impact damping member 33 provides impact absorption in the radially inward direction without substantial deflection of the member 33 in a direction parallel to the axis of rotation 51.

The impact damping member sections 35 may be mounted to the rim 28 by squeezing portions 53 adjacent the hollow portion 44, and pressing the impact damping member 33 into the rim sections 31 where they may be held in place resiliently.

Figure 4:
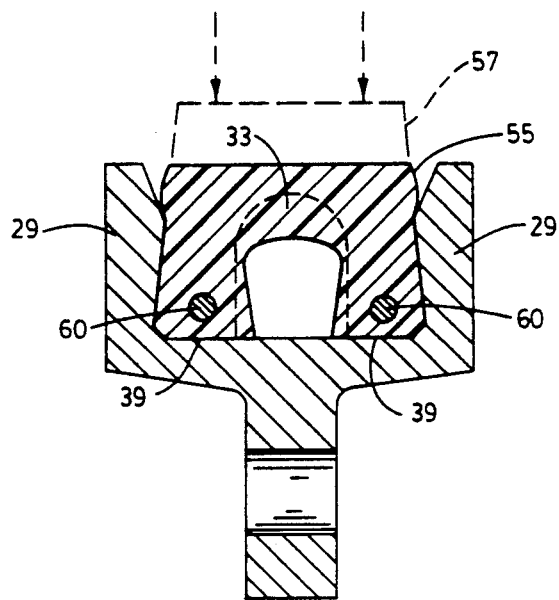
FIG. 4 is an enlarged cross sectional view of an impact damping member and rim that are included in the apparatus shown in FIG. 1.

Referring to FIG. 4, a cross-sectional depiction of how the impact damping member 33 is deformed during contact with the bucket container 10 is shown as a solid outline 55. The non-deformed shape is shown with a dashed outline 57 for comparison.

Figure 5:
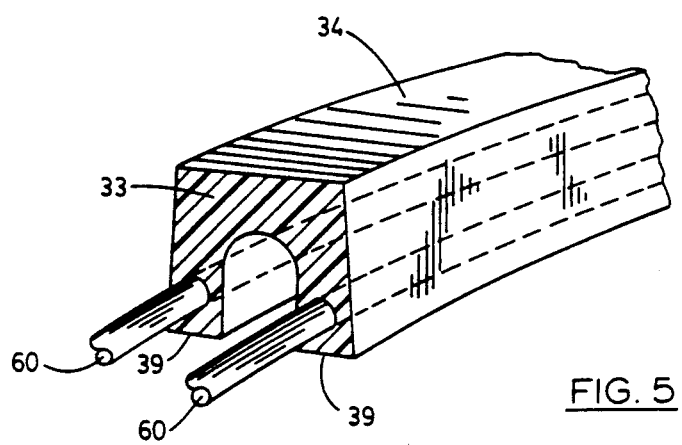
FIG. 5 is an enlarged cross sectional view of an alternate impact damping member that could be included in the centrifugal discharge elevator shown in FIG. 1.

As shown in FIGS. 3-5, at least one circumferentially extending, generally non-extrusible structural member 60 is included in the impact damping member 33, to impede extrusion or stretching of the impact damping member 33 in the circumferential direction. The structural member 60 could be a cable, belt, or solid bar of a metal such as steel. The impact damping member 33 is molded around the structural member 60. In the illustrations, two structural members 60 are provided in the portions 53 adjacent the hollow portion 44.

While a preferred embodiment of the invention has been disclosed, various obvious modifications will become apparent to those skilled in the art. For example, either the foot wheel, or head wheel of an elevator could include a traction wheel with an impact damping member 33, although for best container life both the foot wheel or head wheel will include an impact damping member 33. Thus, the scope of the invention should only be limited by the spirit and scope of the appended claims.

We claim:

1. An impact damping device for a conveyor traction wheel assembly to support an elongated flexible drive member, the traction wheel assembly including a periphery having a circumferential support surface, said impact damping device comprising an elongated generally elastomeric impact damping member having a base adapted to extend along at least a portion of the circumferential support surface, said impact damping member further including spaced apart sides, a radially outwardly facing surface adapted to define at least a portion of a circumferential surface for supporting the elongated flexible drive member, and a hollow portion formed radially interiorly to said outwardly facing surface and extending radially outwardly from said base of said impact damping member, said impact damping member being adapted to extend in the circumferential direction defined by the circumferential support surface, said impact damping member being generally formed of molded polyurethane material.

2. An impact device in accordance with claim 1 wherein said polyurethane material is more particularly defined as cast polyurethane M.D.I. ester.

3. An impact damping device in accordance with claim 1 wherein said impact damping member is molded in the general shape of a segment of a circle.

4. An impact damping device in accordance with claim 1 wherein said sides of said impact damping member are of equal length.

5. An impact damping device in accordance with claim 4 wherein said hollow portion of said impact damping member is generally in the shape of a radially inwardly opening "U" in cross section.

6. An impact damping device in accordance with claim 5 wherein said hollow portion of said impact damping member is centered between said sides of said member.

7. An impact damping device in accordance with claim 6 wherein said impact damping member has a generally frusto-triangular cross sectional outline, and wherein said spaced apart sides are more greatly spaced apart at said base of said impact damping member than at said radially outwardly facing surface of said impact damping member.

8. An impact damping device in accordance with claim 1 and further comprising a first and second circumferentially extending structural member in said impact damping member, proximate said base edge, and wherein said first mentioned structural member is separated from said second structural member by said hollow portion.

9. An impact damping device in accordance with claim 8 wherein said first and second structural members are formed in said impact damping member when said polyurethane material is molded.

10. An impact damping device in accordance with claim 9 wherein said first and second structural members are comprised of steel.

11. A traction wheel assembly for engagement with a flexible drive member, said traction wheel assembly comprising:
 a generally discoidal hub;
 a rim comprising a plurality of partially circumferentially extending rim sections adapted to be fastened to said hub to define a circumferentially extending support surface; and
 an elastomeric impact damping member segment adapted to be mounted in each rim section to define, when said traction wheel assembly is assembled, a circumferential surface for engaging the flexible drive member, each impact damping member segment having a circumferential extent corresponding to the circumferential extent of the rim section in which said segment is adapted to be mounted, said impact damping members segments being formed of molded polyurethane material.

12. A traction wheel assembly in accordance with claim 11 wherein an elastomeric impact damping member segment has a generally frusto-triangular cross sectional outline having sides, a base, and an edge adapted to form a portion of the circumferential surface, said sides being more greatly spaced apart at said base than at said edge that is adapted to form a portion of the circumferential surface, said impact damping member having a hollow portion proximate said base edge and extending in the circumferential direction, said impact damping member being mounted in said rim with said base facing radially inwardly.

13. A traction wheel assembly adapted to drivingly engage a flexible drive member, said traction wheel assembly comprising:
 a rotatable member adapted to rotate about an axis, the rotatable member including a circumferentially extending rim defined by circumferentially extending spaced apart sidewalls, and
 a circumferentially extending impact damping member mounted in said rim between said spaced apart sidewalls, and including a radially outwardly facing surface normally extending radially outwardly from the rim past said sidewalls, said impact damping member, at a location along the circumference thereof and during rotation of said traction wheel assembly, initially engaging a location along the flexible drive member and thereafter deforming radially inwardly such that said sidewalls of said rim drivingly engage the location along the flexible drive member.

14. A traction wheel assembly in accordance with claim 13 wherein said impact damping member includes a circumferentially extending hollow portion defined radially interiorly to said radially outwardly facing surface.

15. A traction wheel assembly in accordance with claim 13 wherein said impact damping member has a generally frusto-triangular cross sectional outline having sides, a base, and an edge defining said radially outwardly facing surface, said sides being more greatly spaced apart at said base than at said edge that defines the radially outwardly facing surface, said impact damping member being mounted in said rim with said base facing radially inwardly.

16. A traction wheel assembly in accordance with claim 15 wherein said sides of said impact damping member, in cross-section, are of equal dimension.

17. A traction wheel assembly in accordance with claim 15 wherein said impact damping member includes a circumferentially extending hollow portion defined radially interiorly to said radially outwardly facing surface, said hollow portion extending radially outwardly from said base and being generally in the shape of a radially inwardly facing "U" in cross section.

18. A traction wheel assembly in accordance with claim 13 and further comprising first and second circumferentially extending structural members in said impact damping member, proximate said base, wherein said first mentioned structural member is separated from said second structural member by said hollow portion.

19. A traction wheel assembly in accordance with claim 18 wherein said impact damping member is formed of molded viscoelastic material and wherein said first and second structural members are formed in said impact damping member when said viscoelastic material is molded.

20. A traction wheel assembly in accordance with claim 18 wherein said first and second structural members are comprised of steel.

21. A traction wheel assembly in accordance with claim 13 wherein said impact damping member is formed of a viscoelastic material.

22. A centrifugal discharge elevator comprising:
a frame;
a first traction wheel assembly supported by the frame;
a second traction wheel assembly supported by said frame and separated from said first traction wheel assembly;
a chain loop having a path of travel defined by said first and second traction wheel assemblies, said chain loop comprising a plurality of pairs of sidebars linked together by chain pins; and
a plurality of bucket containers fastened to said chain loop and adapted to travel with said chain loop; and
at least one of said first and second traction wheel assemblies including a circumferentially extending rim, said rim including two circumferentially extending spaced apart sidewalls, said assembly further including a circumferentially extending impact damping member mounted in said rim between the two side walls and including a radially outwardly facing surface normally extending radially outwardly from the rim past said sidewalls, said impact damping member, at a location along the circumference thereof and during rotation of said traction wheel assembly, initially drivingly engaging a location along the chain, and thereafter deforming radially inwardly such that said sidewalls of said rim drivingly engage the location along the chain.

23. A centrifugal discharge elevator in accordance with claim 22 wherein said impact damping member is formed of a viscoelastic material.

24. A centrifugal discharge elevator in accordance with claim 22 wherein said impact damping member is formed of molded polyurethane material.

25. A centrifugal discharge elevator in accordance with claim 22 wherein said impact damping member includes a circumferentially extending hollow portion defined radially interiorly to said radially outwardly facing surface.

26. A centrifugal discharge elevator in accordance with claim 25 wherein said hollow portion extends radially outwardly from said rim.

27. A centrifugal discharge elevator in accordance with claim 26 wherein said hollow portion is generally in the shape of a radially inwardly facing "U" in cross section.

28. A centrifugal discharge elevator in accordance with claim 23 wherein said chain further includes bushings surrounding said chain pins, and wherein said impact damping member and said spaced apart sidewalls engage said bushings of said chain between said sidebars.

* * * * *